Patented Sept. 9, 1947

2,427,126

UNITED STATES PATENT OFFICE 2,427,126

PRODUCTION OF TEXTILES AND OTHER ARTICLES HAVING A BASIS OF A POLY-VINYL COMPOUND

Henry Dreyfus, London, England; Claude Bonard administrator of said Henry Dreyfus, deceased No Drawing. Application November 4, 1942, Serial No. 464,516. In Great Britain October 24, 1941

7 Claims. (Cl. 8—115.5)

This invention relates to the production of filaments and other articles having a basis of polyvinyl compounds.

Processes have been described for the production of artificial threads and similar articles by spinning solutions of polyvinyl acetate and other polyvinyl esters in organic solvents either by the dry- or wet-spinning processes. The articles produced tend, however, to soften or melt at low temperatures, e. g. 80° C., which renders them unsuitable for many purposes, particuarly as textiles which are likely to be subjected to washing and ironing.

Processes have also been described for the production of threads and similar articles having a basis of polyvinyl alcohol, according to which aqueous solutions of polyvinyl alcohol are spun, usually into aqueous coagulating media. Wet-spinning however, is slow, compared with the speeds attainable by dry-spinning processes, and moreover it is difficult to produce threads of good tensile and other properties in such a manner.

The present invention is concerned with threads, foils and other articles having a basis of polyvinyl compounds which contain hydroxy groups and may also contain acetate or other ester groups, and relates to new and improved methods for producing such articles and also to new types of threads, foils and other articles which have a basis of polyvinyl compounds containing hydroxy groups and ester groups.

According to the present invention, articles may be produced by dry-spinning processes which have better properties, particularly as regards softening and melting points, than the polyvinyl ester yarns previously described.

The threads and other articles with which the present application is concerned may be divided into two broad classes:

(a) Articles having a basis of polyvinyl compounds which are soluble in organic solvents and contain a high or fairly high proportion of organic acid ester groups, and (b) Articles having a basis of polyvinyl compounds which are soluble or dispersible in water or dilute aqueous liquors. Such compounds have a lower ester content than corresponding compounds of class (a).

Both classes of articles may be produced by the saponification of articles having a basis of a polyvinyl ester, either a fully esterified ester or one containing some hydroxy groups but fewer than are required in the desired article. The articles of class (a) may also be produced directly from compositions containing esters having the required proportion of ester groups.

The polyvinyl compounds from which are produced the threads and other articles with which the present application is concerned may contain one or more types of ester groups. For instance the articles may have a basis of polyvinyl acetate, polyvinyl butyrate or other organic polyvinyl ester, of polyvinyl chloride, or of a copolymer produced, for example, by polymerising two organic esters of vinyl alcohol or vinyl chloride and an organic ester of vinyl alcohol together. For instance, threads made of a copolymer obtained by polymerising a mixture containing 80 to 90% of vinyl chloride and 20 to 10% of vinyl acetate may be saponified in accordance with the process of the present invention in order to yield threads containing free hydroxy groups. Preferably the polyvinyl compound of which the threads are formed is one having a high melting-point, e. g. 150 to 190° C. or more. By saponification this may be increased considerably, e. g. up to 240° or 250° C. or more.

As has already been stated, the invention is concerned with the production of articles having a basis of polyvinyl compounds which are soluble or dispersible in water or dilute aqueous liquors and with articles having a basis of polyvinyl compounds which are soluble in organic solvents and contain a high or fairly high proportion of organic acid ester groups. Among the latter class of articles those having a basis of a polyvinyl compound in which about 50 to 60% of the total hydroxy groups are esterified, the remainder being free hydroxy groups, are particularly valuable. They have substantially higher softening and melting points than articles made of similar polyvinyl compounds containing fewer or no free hydroxy groups. For instance, they may have a melting-point of 200 to 220° C. or more. Moreover, when the articles are prepared directly by spinning a solution of the polyvinyl compound it is found that setting and hardening of the filaments or other articles is easier than in the case of articles made from polyvinyl compounds containing higher proportions of ester radicles. Such articles may be spun, for example, from solutions in anhydrous or substantially anhydrous acetone, benzene or other suitable volatile solvent, the solution being extruded into hot air or other hot evaporative medium. The length of travel of the extruded filaments or other articles through the evaporative meduim will depend in part on the temperature of the evaporative medium, the higher the temperature the shorter being the length of the path required. Usually it is found preferable to use a fairly low temperature for the evaporative medium, for example 40 to 60° C. and to make the path of travel of the filaments through the evaporative medium longer than that normally used in dry-spinning processes. It may, for example, be 20 or 25 feet or more. Contrary to the usual practice in the production of filaments and other articles by dry-spinning, it has been found preferable, according to the present invention, to use a current of evaporative medium which travels in the same direction as the filaments or other articles. As the articles issue from the cell they may be passed through a bath of water or of an aqueous solution of a wetting agent and continuously washed with cold water while they are being taken up. The washing bath may be at atmospheric temperature or at a somewhat higher temperature, for example 30 or 50° C. If a wet-spinning process is employed the coagulating bath is preferably aqueous. A dilute aqueous solution of acetic acid may, for instance, be used.

Yarns and similar articles may be stretched to increase their tenacity. For instance, they may be stretched to 300 or 400% of their original length in water at 50 to 70° C. and afterwards set by immersing them for several hours in water at the stretching temperature employed.

The saponification of filaments and other articles without detrimentally affecting their structure presents a problem which offers many difficulties, particularly if a high degree of saponification is to be effected as in the case when the desired products are soluble or dispersible in water, on account of the wide range of liquids in which polyvinyl esters are soluble. Aqueous solutions of saponifying agents cannot be employed unless the products are to contain a substantial proportion of ester groups, nor can solutions of caustic soda or other saponifying agent in methyl or ethyl alcohol. Many other organic liquids which might otherwise be considered, for example acetone, dioxane and benzene, are also unsuitable since they are liable to affect the structure of the articles at one stage or other during saponification. It has, however, been discovered that saponification may be effected by the use of a solution of a saponifying agent, particularly sodium or potassium hydroxide, in hexyl or heptyl alcohol or a higher homologue thereof. Preferably, saponification is effected using a very dilute solution of a saponifying agent, for example a solution containing 0.1 to 0.5% of sodium or potassium hydroxide, the amount of saponifying agent being substantially less than that theoretically necessary to effect the desired degree of saponification. In this manner it is possible to obtain products in which saponification has been effected substantially uniformly throughout the polyvinyl compound. The solvent for the saponifying agent need not consist wholly of hexyl alcohol or a higher homologue thereof; it may also contain methyl, ethyl or other lower alcohol or even water, provided that the liquid as a whole has no deleterious effect on the properties of the articles which are saponified.

The tenacity of threads and other articles made of a polyvinyl compound which is soluble or dispersible in water may be increased by stretching them, e. g. in air at atmospheric temperature or somewhat higher.

The filaments and other articles produced according to the present invention may be reacted with reagents adapted to combine with the free hydroxy groups and in this way the properties of the articles may be modified. For example their solubility properties, particularly in polar solvents, may be reduced by reacting them with formaldehyde, acetaldehyde and other aldehydes or ketones and their softening or melting points may be raised substantially by reacting them with a reagent containing two esterifying radicles, for example, succinyl, adipyl or phthalyl chloride or a dianhydride, particularly a mixed anhydride of acetic acid and a dicarboxylic acid such as succinic, adipic or phthalic acid. Such treatments not only increase the melting points of the articles but also in general reduce their solubility properties considerably. Articles containing chlorine or other halogen atoms may be reacted with diamines, for example ethylene diamine, hexamethylene diamine or paraphenylene diamine.

The following examples are given to illustrate the invention:

Example 1

A 20% solution in anhydrous acetone of a polyvinyl acetate containing 60% of the maximum theoretical quantity of acetyl radicles is spun downwards into a co-current of hot air at a temperature of about 60° C. The filaments emerging from the cell are passed through a bath containing an aqueous solution of a wetting agent at a temperature of 60° C. and are then taken up on a bobbin which is continuously washed with cold water. After winding, the filaments are passed through a bath containing water at a temperature of 50 to 70° C. in which they are stretched to 3 times their original length, after which they are set by immersion for several hours in water at the same temperature. They are then dried by passage through a hot air chamber and taken up on a bobbin.

Example 2

Polyvinyl acetate yarn in hank form is immersed in a 0.2% solution of sodium hydroxide in hexyl alcohol at 25° C., the ratio of solution to yarn being 30 to 1. The hanks are carefully turned at intervals to assist uniform saponification and allowed to remain in the bath until complete saponification has been effected. They are then withdrawn, carefully washed with hexyl alcohol and then dried.

Threads produced according to the process of the present invention may be employed for the production of cords, ropes, fabrics and other articles. Threads which are soluble or easily dispersible in water are particularly valuable for the production of shrouds, canopies and other parts of parachutes employed for mines to be laid in the sea or rivers, since the articles made from them are rapidly dispersed so that the presence of the mines is not revealed.

Having described my invention, what I desire to secure by Letters Patent is:

1. Process for the manufacture of shaped articles, which comprises saponifying artificial threads, foils and similar articles having a basis of a polyvinyl compound containing ester groups by means of a solution consisting of a caustic alkali dissolved in a straight chain aliphatic monohydric alcohol containing at least six carbon atoms, the said solvent being substantially without action on the polyvinyl compound before and after the saponification.

2. Process for the production of shaped articles, which comprises saponifying artificial threads, foils and similar articles having a basis of a polyvinyl compound containing ester groups by means of a solution consisting of a caustic alkali dissolved in substantially pure hexyl alcohol.

3. Process for the production of shaped articles, which comprises saponifying artificial threads, foils and similar articles having a basis of a polyvinyl acetate by means of a solution consisting of a caustic alkali dissolved in substantially pure hexyl alcohol.

4. Process for the production of shaped articles, which comprises saponifying artificial threads, foils and similar articles having a basis of a polyvinyl acetate by means of a solution consisting of caustic alkali dissolved in a substantially pure straight chain aliphatic monohydric alcohol containing at least 6 carbon atoms, saponification being continued until the products are easily dispersible in water.

5. Process for the production of shaped articles, which comprises saponifying artificial threads, foils and similar articles having a basis of a polyvinyl acetate by means of a solution consisting of a caustic alkali in amount less than is stoichiometrically equivalent to the amount of acetyl radicle to be removed, dissolved in a substantially pure straight chain aliphatic monohydric alcohol containing at least 6 carbon atoms.

6. Process for the production of shaped articles, which comprises saponifying artificial threads, foils and similar articles having a basis of a polyvinyl acetate by means of a solution consisting of a caustic alkali in amount less than is stoichiometrically equivalent to the amount of acetyl radicle to be removed, dissolved in substantially pure hexyl alcohol.

7. Process for the production of shaped articles, which comprises saponifying artificial threads, foils and similar articles having a basis of a polyvinyl acetate by means of a solution consisting of caustic alkali dissolved in a substantially pure straight chain aliphatic monohydric alcohol containing at least 6 carbon atoms, saponification being continued until the products contain 50 to 60% of the greatest number of acetate groups theoretically possible.

HENRY DREYFUS.

REFERENCES CITED

The following references are of record in the file of this patent:

UNITED STATES PATENTS

| Number | Name | Date |
| --- | --- | --- |
| 2,295,660 | Hubert et al. | Sept. 15, 1942 |
| 2,236,061 | Izard et al. | Mar. 25, 1941 |
| 2,130,212 | Watkins | Sept. 13, 1938 |
| 2,169,250 | Izard | Aug. 15, 1939 |
| 1,672,156 | Herrmann et al. | June 5, 1928 |
| 1,897,856 | Moller | Feb. 14, 1933 |
| 2,072,303 | Herrmann et al. | Mar. 2, 1937 |
| 2,208,857 | Schlack | July 23, 1940 |
| 2,109,883 | Herrmann et al. | Mar. 1, 1938 |
| 2,227,997 | Berg | Jan. 7, 1941 |
| 2,267,842 | Schlack | Dec. 30, 1941 |
| 2,053,766 | Dreyfus | Sept. 8, 1936 |
| 2,053,767 | Dreyfus | Sept. 8, 1936 |

FOREIGN PATENTS

| Number | Country | Date |
| --- | --- | --- |
| 114,890 | Australia | Mar. 26, 1942 |

OTHER REFERENCES

Trans. Royal Soc. Canada—Sec. III, 1928—article pp. 27–32 particularly pp. 31 and 32, by Whitby et al.